US006944704B2

(12) United States Patent
Brelin

(10) Patent No.: US 6,944,704 B2
(45) Date of Patent: Sep. 13, 2005

(54) METHOD AND APPARATUS FOR UTILIZING EXTENDED AV/C COMMAND FRAMES INCLUDING STATUS INQUIRY, NOTIFY INQUIRY AND CONTROL INQUIRY COMMAND TYPES

(75) Inventor: Jon Ebbe Brelin, Campbell, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 735 days.

(21) Appl. No.: 09/972,488

(22) Filed: Oct. 4, 2001

(65) Prior Publication Data

US 2003/0070028 A1 Apr. 10, 2003

(51) Int. Cl.$^7$ .................... G06F 13/00; G06F 13/10; G06F 13/38
(52) U.S. Cl. .................... 710/305; 710/62; 712/214; 725/80
(58) Field of Search ............................. 710/305, 62, 8, 710/100, 5, 105, 11; 370/257, 451; 709/224, 220, 203, 300; 712/214; 707/3; 725/80

(56) References Cited

U.S. PATENT DOCUMENTS

| 4,780,821 A | 10/1988 | Crossley ...................... 364/200 |
| 4,922,486 A | 5/1990 | Lidinsky et al. .............. 370/60 |
| 5,020,054 A | 5/1991 | May, Jr. ...................... 370/94 |

(Continued)

FOREIGN PATENT DOCUMENTS

| EP | 0 577 054 A1 | 1/1994 | ............ H04N/7/18 |
| EP | 0 631 247 A2 | 6/1994 | ........... G06F/15/44 |
| EP | 0 789 502 A2 | 9/1997 | ........... H04Q/11/04 |
| EP | 0 812 092 A2 | 10/1997 | ........... H04L/29/06 |
| JP | 0 932 681 2 A | 12/1997 | ........... H04L/12/40 |

OTHER PUBLICATIONS

"Code compression techniques using operand field remapping" by Lin, K.; Chung, C.P. (abstract only) Publication Date: Jan. 2002.*
"higher performance and lower power enhancements to VLIW architectures" by Gass, W. (abstract only) Publication Date: Sep. 26–28, 2001.*
"Real–time DV Transmission on Hybrid Network with IEEE 1394 and ATM", Miyashita et al., AVC Products Development Laboratory, Matsushita Electric Industrial Co., Ltd. 1006, Kadoma, Kadoma–shi, Osaka Japan. pp. 148–149.
"Home Network File System for Home Network Based on IEEE–1394 Technology," Tatsuya Igrashi et al., IT Laboratories, Sony Corporation, Tokyo, Japan, Aug. 1999, pp. 1000–1003.
"The IEEE–1394 High Speed Serial Bus" by R.H.J. Bloks, 1996, pp. 209–216.
"A Bus on a Diet–The Serial Bus Alternative,An Introduction to the P1394 High Performance Serial Bus", Michael Teener, Apple Computer, Inc., Santa Clara, CA., Published Feb. 24, 1992, pp. 316–321.

(Continued)

Primary Examiner—Gopal C. Ray
(74) Attorney, Agent, or Firm—Haverstock & Owens LLP

(57) ABSTRACT

A modified AV/C command set includes status inquiry, notify inquiry and control inquiry commands. The status inquiry, notify inquiry and control inquiry commands include an opcode and any number of operands. Thus, the status inquiry, notify inquiry and control inquiry commands can include only an opcode. The status inquiry, notify inquiry and control inquiry commands are sent from a controller to a target device to determine if the target device supports a particular status, notify or control command, respectively. In response to a status inquiry, notify inquiry or control inquiry command, a target device sends a response to the controller notifying the controller as to whether or not the target device supports the particular command.

15 Claims, 6 Drawing Sheets

U.S. PATENT DOCUMENTS

| | | | |
|---|---|---|---|
| 5,077,732 A | 12/1991 | Fischer et al. | 370/85.4 |
| 5,117,070 A | 5/1992 | Ueno et al. | 178/2 R |
| 5,367,679 A | 11/1994 | Khaira | 395/650 |
| 5,394,522 A | 2/1995 | Sanchez-Frank et al. | 395/159 |
| 5,422,883 A | 6/1995 | Hauris et al. | 370/62 |
| 5,436,898 A | 7/1995 | Bowen et al. | 370/79 |
| 5,446,733 A | 8/1995 | Tsuruoka | 370/60.1 |
| 5,471,474 A | 11/1995 | Grobicki et al. | 370/85.2 |
| 5,479,385 A | 12/1995 | Hoekstra | 369/24 |
| 5,495,481 A | 2/1996 | Duckwall | 370/85.2 |
| 5,499,018 A | 3/1996 | Welmer | 340/825.07 |
| 5,500,934 A | 3/1996 | Austin et al. | 395/755 |
| 5,524,213 A | 6/1996 | Dais et al. | 395/200.17 |
| 5,528,513 A | 6/1996 | Vaitzblit et al. | 364/514 A |
| 5,548,722 A | 8/1996 | Jalalian et al. | 395/200.1 |
| 5,555,413 A | 9/1996 | Lohman et al. | 395/733 |
| 5,557,724 A | 9/1996 | Sampat et al. | 395/157 |
| 5,574,867 A | 11/1996 | Khaira | 395/293 |
| 5,579,496 A | 11/1996 | Van Steenbrugge | 395/567 |
| 5,632,016 A | 5/1997 | Hoch et al. | 395/200.02 |
| 5,650,775 A | 7/1997 | Van Steenbrugge | 340/825.24 |
| 5,659,373 A | 8/1997 | Hoekstra | 348/734 |
| 5,682,489 A | 10/1997 | Harrow et al. | 395/349 |
| 5,694,555 A | 12/1997 | Morriss et al. | 395/280 |
| 5,719,942 A | 2/1998 | Aldred et al. | 380/49 |
| 5,724,646 A | 3/1998 | Ganek et al. | 455/4.2 |
| 5,781,703 A | 7/1998 | Desai et al. | 395/54 |
| 5,793,366 A | 8/1998 | Mano et al. | 345/329 |
| 5,815,678 A | 9/1998 | Hoffman et al. | 395/309 |
| 5,933,430 A | 8/1999 | Osakabe et al. | 370/395 |
| 5,991,520 A | 11/1999 | Smyers et al. | 395/280 |
| 6,055,641 A | 4/2000 | Konaka et al. | 713/320 |
| 6,094,681 A | 7/2000 | Shaffer et al. | 709/224 |
| 6,141,702 A | 10/2000 | Ludtke et al. | 710/5 |
| 6,150,953 A | 11/2000 | Tanaka et al. | 340/825.37 |
| 6,160,796 A | 12/2000 | Zou | 370/257 |
| 6,169,725 B1 | 1/2001 | Gibbs et al. | 370/216 |
| 6,233,611 B1 | 5/2001 | Ludtke et al. | 709/223 |
| 6,288,716 B1 | 9/2001 | Humpleman et al. | 345/329 |
| 6,292,624 B1 | 9/2001 | Saib et al. | 386/83 |
| 6,359,557 B2 | 3/2002 | Bilder | 340/531 |
| 6,363,434 B1 | 3/2002 | Eytchison | 709/313 |
| 6,370,688 B1 | 4/2002 | Hejna, Jr. | 725/101 |
| 6,401,119 B1 | 6/2002 | Fuss et al. | 709/224 |
| 6,438,110 B1 | 8/2002 | Rai et al. | 370/254 |
| 6,466,971 B1 | 10/2002 | Humpleman et al. | 709/220 |
| 6,513,064 B1 | 1/2003 | Horiguchi et al. | 709/223 |
| 6,516,416 B2 | 2/2003 | Gregg et al. | 713/201 |
| 6,564,295 B2 | 5/2003 | Okabayashi et al. | 711/114 |
| 6,584,502 B1 | 6/2003 | Natarajan et al. | 709/224 |
| 6,654,821 B1 | 11/2003 | Aikawa et al. | 710/36 |
| 6,751,687 B1 * | 6/2004 | Sato et al. | 710/62 |
| 6,775,714 B1 * | 8/2004 | Miyano | 710/8 |
| 6,804,795 B1 * | 10/2004 | Kawamura et al. | 714/10 |
| 2001/0021194 A1 | 9/2001 | Horiguchi et al. | 370/421 |
| 2002/0026540 A1 | 2/2002 | Smyers | 710/8 |
| 2002/0196374 A1 | 12/2002 | Barry et al. | 348/725 |

OTHER PUBLICATIONS

"P1394 Standard for a High Performance Serial Bus", Copyright 1995, by The Institute of Electrical and Electronic Engineers, Inc., pp. 1–384.

"AV/C Digital Interface Command Set General Specification", by 1394 Trade Association, Version 3.0, Apr. 15, 1998, pp. 1–91.

* cited by examiner

METHOD AND APPARATUS FOR UTILIZING EXTENDED AV/C COMMAND FRAMES INCLUDING STATUS INQUIRY, NOTIFY INQUIRY AND CONTROL INQUIRY COMMAND TYPES

FIELD OF THE INVENTION

The present invention relates to the field of sending and receiving commands between devices coupled together within a network. More particularly, the present invention relates to the field of sending and receiving AV/C command frames for inquiring about status and implementation capabilities of target devices.

BACKGROUND OF THE INVENTION

The IEEE standard, "IEEE 1394-2000 Standard For A High Performance Serial Bus," Draft ratified in 2000, is an international standard for implementing an inexpensive high-speed serial bus architecture which supports both asynchronous and isochronous format data transfers. Isochronous data transfers are real-time transfers which take place such that the time intervals between significant instances have the same duration at both the transmitting and receiving applications. Each packet of data transferred isochronously is transferred in its own time period. An example of an ideal application for the transfer of data isochronously would be from a video recorder to a television set. The video recorder records images and sounds and saves the data in discrete chunks or packets. The video recorder then transfers each packet, representing the image and sound recorded over a limited time period, during that time period, for display by the television set. The IEEE 1394-2000 serial bus architecture provides multiple channels for isochronous data transfer between applications. A six bit channel number is broadcast with the data to ensure reception by the appropriate application. This allows multiple applications to simultaneously transmit isochronous data across the bus structure. Asynchronous transfers are traditional data transfer operations which take place as soon as possible and transfer an amount of data from a source to a destination.

The IEEE 1394-2000 standard provides a high-speed serial bus for interconnecting digital devices thereby providing a universal I/O connection. The IEEE 1394-2000 standard defines a digital interface for the applications thereby eliminating the need for an application to convert digital data to analog data before it is transmitted across the bus. Correspondingly, a receiving application will receive digital data from the bus, not analog data, and will therefore not be required to convert analog data to digital data. The cable required by the IEEE 1394-2000 standard is very thin in size compared to other bulkier cables used to connect such devices. Devices can be added and removed from an IEEE 1394-2000 bus while the bus is active. If a device is so added or removed the bus will then automatically reconfigure itself for transmitting data between the then existing nodes. A node is considered a logical entity with a unique address on the bus structure. Each node provides a configuration ROM, a standardized set of control registers and its own address space. Because of these advantages the IEEE 1394-2000 standard provides for a unique networking structure that is capable of incorporating audio/video devices, media play/record devices, computing devices and display devices.

The IEEE 1394-2000 standard defines a protocol as illustrated in FIG. 1. This protocol includes a serial bus management block 10 coupled to a transaction layer 12, a link layer 14 and a physical layer 16. The physical layer 16 provides the electrical and mechanical connection between a device or application and the IEEE 1394-2000 cable. The physical layer 16 also provides arbitration to ensure that all devices coupled to the IEEE 1394-2000 bus have access to the bus as well as actual data transmission and reception. The link layer 14 provides data packet delivery service for both asynchronous and isochronous data packet transport. This supports both asynchronous data transport, using an acknowledgement protocol, and isochronous data transport, providing real-time guaranteed bandwidth protocol for just-in-time data delivery. The transaction layer 12 supports the commands necessary to complete asynchronous data transfers, including read, write and lock. The transaction layer 12 also provides a path for isochronous management data to be transferred to the serial bus management block 10 via read operations with isochronous control compare-swap registers. The serial bus management block 10 contains an isochronous resource manager for managing isochronous data transfers. The serial bus management block 10 also provides overall configuration control of the serial bus in the form of optimizing arbitration timing, guarantee of adequate electrical power for all devices on the bus, assignment of the cycle master, assignment of isochronous channel and bandwidth resources and basic notification of errors.

A diverse range of products can be implemented with the ability to connect to an IEEE 1394-2000 serial bus network. These devices can have capabilities and functionality ranging from very simple to very complex. Specifically, a variety of audio/video devices, media play/record devices and computing/display devices are capable of being linked together over an IEEE 1394-2000 serial bus networking structure to support asynchronous and isochronous data transfers between the devices.

The IEEE 1394-2000 serial bus allows a collection of devices to work together in a high bandwidth, distributed environment to maximize the overall efficiency and functionality of the network. This allows manufacturers to remove expensive pieces of functionality from one device and locate that functionality in another device on the network, instead of duplicating this functionality in all devices on the network. While some of the devices have limited functionality and are relatively inexpensive, such devices require the support and interaction of other devices in order to bring the full functionality of the devices within the network to the user.

The AV/C Digital Interface Command Set is a command set used for data transactions between consumer audio/video equipment over an IEEE 1394-2000 serial bus. Neither the IEEE 1394-2000 serial bus nor the AV/C command set provide a master-slave relationship between the devices coupled within the IEEE 1394-2000 serial bus network. Instead, both the IEEE 1394-2000 serial bus and the AV/C command set operate based on a cooperative peer-to-peer coexistence of devices within the network. Discrete AV/C command and response data packets are transferred between networked devices over an IEEE 1394-2000 serial bus in an asynchronous data stream. The AV/C command and response data packets are typically formatted according to the AV/C protocol outlined in the AV/C Digital Interface Command Set. Transfers of AV/C command and response data packets over the IEEE 1394-2000 serial bus network are supported by an AV/C architecture. The AV/C architecture is used by devices to create, process and/or transmit AV/C command and response data packets.

The target device is controllable by a controller device that initiates desired data transactions. The desired data transactions are IEEE 1394-2000 write transactions, wherein a controller device requests a target device to perform a task. The data transactions are contained within command and response frames of the command and request data packets which are formatted according to the Function Control Protocol (FCP) and then transferred asynchronously between device nodes on the IEEE 1394-2000 serial bus.

A format of a block write packet 30 according to the IEEE 1394-2000 standard is illustrated in FIG. 2. The asynchronous block write packet includes a header 31 and a data payload 32. The header 31 includes the fields destination_ID, t1, rt, tcode, pri, source_ID, destination_offset, data_length, extended_tcode and header_crc. The destination_ID field is a sixteen bit field which specifies the node ID of the receiving node to which the packet is addressed. The transaction label field t1 is a six bit field that specifies a unique tag for each outstanding transaction from a node. The retry code field rt is a two bit field which specifies whether the packet is a retry attempt and the retry protocol to be followed by the destination node. The transaction code field tcode is a four bit field that specifies the packet format and the type of transaction that is to be performed. For a write request for data block operation the transaction code field value is equal to 0001.

The priority field pri is a four bit field that is used by the back plane. The source-ID field is a sixteen bit field that specifies the node ID of the transmitting node of the packet. The destination offset field is a forty-eight bit field that specifies the forty-eight bits of the destination node address of the request packet. The data length field is a sixteen bit field that specifies the length of the data field of data block payload packets. The extended transaction code field extended_tcode is a sixteen bit field that conventionally is only meaningful if the transaction code field indicates a lock request or lock response packet. The header_CRC field is a thirty-two bit field that is used to perform a cyclical redundancy check (CRC) on the data within the header.

The data portion of the packet includes a data block payload field and a data_crc field. The data_crc field is a thirty-two bit field that is used to perform a cyclical redundancy check (CRC) on the data within the data portion of the packet.

AV/C command and response data packets are transmitted between networked devices using the FCP data fields of the asynchronous write packet 30, and have the format illustrated in FIG. 2 and described above. The data packets are transmitted over the serial bus and received by a device with the appropriate destination address. Using a read transaction, data at a particular address within a responding node is transferred back to a requesting node. Using a write transaction, data is transferred from a requesting node to a particular address within one or more responding nodes. Using lock transactions, data is transferred from a requesting node to a responding node, processed with data at a particular address within the responding node and the result is then transferred back to the requesting node.

Again referring to FIG. 2, the data payload frame 33 is organized into a sequence of data fields according to the Function Control Protocol (FCP) defined by the standard IEC 61883, Digital Interface For Consumer Audio/Video. The Function Control Protocol frame provides a simple format to encapsulate device command and response data sets within the IEEE 1394-2000 serial bus for asynchronous block read and write data transactions. The payload of the FCP frame 33 is limited to a maximum of 512 bytes.

FIGS. 3A and 3B show a detailed command FCP data frame 40 and a response FCP data frame 50 formatted in accordance with the standard AV/C protocol. The first data fields in both of the data frames 40 and 50 are the cts data fields 41 and 51, respectively. The cts data fields 41 and 51 hold 4 bits of data each and define the transaction format that is to be used in the FCP frames 40 and 50; the code for the standard AV/C format shown in FIGS. 3A and 3B is 0000. The ctype data field 42 and the response data field 52 are also 4 bits in length and encode the data packets 40 and 50 for the type of command or response data transaction. For example, a command frame such as the one shown in FIG. 3A, may be encoded for a control command, an inquiry command or any other data transaction that is required. The subunit type and the subunit ID data fields 43 and 53 encode the data packets 40 and 50 for the resource subunit within the device that is being used to execute the command data set. For example, the command packet may be issued to start a display of a video monitor, to turn on/off a tuner, turn on/off a recorder and the like. Since several subunit resources may belong to the same device or belong to the same device node address, the subunit type and ID is used to distinguish them. The opcode data fields 44 and 54 code the data packets 40 and 50 for the device operation to be executed and the operand data fields define the parameters of the operation to be executed.

As described above, the ctype data field 42 is 4 bits in length and encodes the command data packet 40 for the type of command data transaction included within the data packet 40. Table I below includes the different types of commands specified and the corresponding value for each command.

TABLE I

| AV/C Command Types | |
|---|---|
| VALUE | COMMAND TYPE |
| 0 | CONTROL |
| 1 | STATUS |
| 2 | SPECIFIC INQUIRY |
| 3 | NOTIFY |
| 4 | GENERAL INQUIRY |
| 5–7 | Reserved for future specification |
| 8–$F_{16}$ | Reserved for response codes |

As described above, the response data field 52 is 4 bits in length and encodes the response data packet 50 for the type of response data transaction included within the response packet 50. Table II includes the different types of responses specified and the corresponding value for each response.

TABLE II

| AV/C Response Types | |
|---|---|
| VALUE | COMMAND TYPE |
| 0–7 | Reserved for command types |
| 8 | NOT IMPLEMENTED |
| 9 | ACCEPTED |
| $A_{16}$ | REJECTED |
| $B_{16}$ | IN TRANSITION |
| $C_{16}$ | IMPLEMENTED/STABLE |
| $D_{16}$ | CHANGED |
| $E_{16}$ | Reserved for future specification |
| $F_{16}$ | INTERIM |

As illustrated in Table I above, a value of 0000 within the ctype data field indicates a control command type. A control command is sent by a controller to a target device to instruct the target device to preform an operation. Either the AV unit or a subunit at the target device may be the recipient of the command, as determined by the subunit_type and subunit_ID fields in the command frame. The remaining fields, opcode and operand[n], specify the command. A target device that receives a control command shall return an AV/C reponse frame with one of the following four response codes: not implemented, accepted, rejected and interim. The not implemented response code is returned by the target device if the target device does not support the control command specified by the opcode and operand[n] filed values, or if the command is addressed to a subunit not implemented by the target device. The accepted response code is returned if the target device implements the control command specified by the opcode and operand[n] values and the target state permits execution of the command. The rejected response code is returned if the target device implements the control command specified by the opcode and operand[n] values, but the target state does not permit execution of the command. The interim response code is returned if the target device implements the control command specified by the opcode and operand[n] values, but the target device is unable to respond with either an accepted or rejected response within 100 milliseconds. Unless a subsequent bus reset causes the AV/C transaction to be aborted, after sending an interim response the target device shall ultimately return a response frame with either an accepted or rejected response.

As illustrated in Table I, a value of 0001 within the ctype data field indicates a status command type. A status command is sent by a controller to a target device to instruct the target device to request the target device's current status. Status commands may be sent to either AV units or subunits. A target device that receives a status command shall return an AV/C response frame with one of the following four response codes: not implemented, rejected, in transition and stable. The not implemented response code is returned by the target device if the target device does not support the status command specified by the opcode and operand[n] field values, or the command is addressed to a subunit not implemented by the target device. The rejected response code is returned if the target device implements the status command specified by the opcode and operand[n] values, but the target state does not permit the return of status for the command. The in transition response code is returned by the target device if the target device implements the status command specified by the opcode and operand[n] values, but the target state is in transition, possibly because of an already acknowledged command or a manual operation. A subsequent status command, at an unspecified future time, may result in the return of a stable response code. The stable response code is returned by the target device if the target device implements the status command specified by the opcode and operand[n] values and the information requested is reported in the opcode and operand[n] values in the AV/C response frame.

As illustrated in Table I, a value of 0010 within the ctype data field indicates a specific inquiry command type. Specific inquiry commands may be used by a controller to determine whether or not a target device supports a particular control command. Except for the value within the ctype data field, the AV/C command frame for a specific inquiry command is identical to the corresponding control command. A controller may reliably use specific inquiry commands to probe the capabilities of a target device, since the target device shall not modify any state nor initiate any command execution in response to a specific inquiry command. A target device that receives a specific inquiry command shall return an AV/C response frame with only one of the following two response codes: implemented or not implemented. All other fields in the response frame are exact copies of the command frame. A response of implemented specifies that the corresponding control command specified by the opcode and operand[n] values is implemented by the target device. An AV device implementation may validate all of the operands or it may validate only the opcode and enough of the operands to uniquely identify the control command and determine its support level. A response of not implemented specifies that the corresponding control command specified by the opcode and operand[n] values is not implemented by the target device.

As illustrated in Table I, a value of 0011 within the ctype data field indicates a notify command type. A controller that desires to receive notification of future changes in a target device's state may use the notify command. Responses to a notify command shall indicate the current state of the target device and then, at some indeterminate time in the future, indicate the newly changed state of the target device. A target device that receives a notify command shall not modify its state but shall generate an immediate response frame with one of the following three response codes: not implemented, rejected and interim. The not implemented response code is returned by the target device if the target device does not support the control command specified by the opcode and operand[n] field values, or the command is addressed to a subunit not implemented by the target device. The rejected response code is returned if the target device implements the event notification for the condition specified by the opcode and operand[n] values, but the target device is not able to supply the requested information. A rejected response may return if another controller requests notification of a target device's change of state. The target device then sends a rejected response to the controller indicating that the controller will no longer be notified of a change in state. The interim response code is returned if the target device supports the requested event notification and has accepted the notify command for any future change of state. The current state is indicated by the opcode and operand[n] values returned in the response frame. At some future time, the target device shall return an AV/C response frame with either a rejected or changed response code. Once a target device has accepted a notify command by the return of an interim response frame, the target device is primed to return a subsequent response frame upon the first change in the target device's state. The future change of the target device's state could be the result of an operation in progress when the notify command was received or it could be the result of a control command not yet received by the target device. A changed response code is sent if the target device supports the event notification specified by the opcode and operand[n] values and the target state differs from the target state at the time the interim response was returned. The altered target state is indicated by the opcode and operand[n] data returned in the response frame. This notification is a one-shot operation. If the controller wishes to be notified of additional changes in a target device, the controller must issue a notify command after each changed response.

As illustrated in Table I, a value of 0100 within the ctype data field indicates a general inquiry command type. General inquiry commands may be used by a controller to determine whether or not a target device supports a particular control command without being required to specify a particular set of operands for that command. The format of the general inquiry command frame consists of only the ctype data field, subunit type and subunit ID data fields and the opcode of the command which is being queried. As with the specific inquiry command, the target device shall not modify any state nor initiate any command execution in response to a general inquiry command. A target device that receives an inquiry command shall return an AV/C response frame with only one of the following two response codes: implemented or not implemented. The response frame shall also contain the opcode that was originally passed in. A response of implemented specifies that at least one of the corresponding control command variations specified by the opcode is implemented by the target device. A response of not implemented specifies that none of the corresponding control command variations specified by the opcode value is not implemented by the target device. Unlike other command types, general inquiry commands do not have a support level since they return information about the support level of the corresponding control command. However, the ability of an AV device to provide a response to a general inquiry command for any opcode is mandatory. This insures that the controller shall always receive a response to a general inquiry command.

As illustrated in Table I, the values of 0101 through 0111 are reserved for future specification and the values of 1000 through 1111 are reserved for response codes.

As described above, a controller can issue a general inquiry and specific inquiry command to a target device to determine if a target device supports a particular control command. There is currently no mechanism to determine in advance if a target device supports particular status or notify commands. With the present system, a controller can only assume that a device implements the status or notify command. When a status or notify command is issued by the controller and when a not implemented response is returned, the controller has to respond to the user in some fashion indicating that the feature supplied by the command is not supported.

In order to support existing protocols, some systems, such as Universal plug-and-play perform a query on a device and return a table of all commands supported by the device, thus providing a command feature set for the device. In order to build a table of commands supported by an AV/C target device, a controller may want to inquire for all commands prior to issuing any command. Since AV/C is structured to not provide any capability to inquire about status and notify commands, a controller which currently desires such information, must issue all of the status and notify command types sequentially to determine which commands are supported by the target device. However, this is not desirable, because issuing status and notify commands, while they do not change the state of the target device, require extra processing time and bus usage. Notify commands also may cause response frames to occur at some future time which is unknown by the controller. Further, if these response frames are pending, it is possible for a device to reject all other commands until the final notify command-type is returned.

SUMMARY OF THE INVENTION

A modified AV/C command set includes status inquiry, notify inquiry and control inquiry commands. The status inquiry, notify inquiry and control inquiry commands include an opcode and any number of operands. Thus, the status inquiry, notify inquiry and control inquiry commands can include only an opcode. The status inquiry, notify inquiry and control inquiry commands are sent from a controller to a target device to determine if the target device supports a particular status, notify or control command, respectively. In response to a status inquiry, notify inquiry or control inquiry command, a target device sends a response to the controller notifying the controller as to whether or not the target device supports the particular command.

According to one aspect of the present invention, a method of inquiring of capabilities of a target device comprises sending an inquiry command including an opcode and any number of operands over a network from a controller to a target device, determining at the target device if the target device supports the opcode and operands and sending a response command from the target device to the controller over the network informing the controller if the target device supports the opcode and operands. The inquiry command is a control inquiry command, status inquiry command or a notify inquiry command. Preferably, the network substantially complies with a version of the IEEE 1394 standard.

According to another aspect of the present invention, a method of inquiring of capabilities of a target device comprises sending an inquiry command, selected from a group of a status inquiry command and a notify inquiry command, including an opcode, over a network from a controller to a target device, determining at the target device if the target device supports the opcode and sending a response command from the target device to the controller over the network informing the controller if the target device supports the opcode. The inquiry command further comprises one or more operands and further wherein determining also includes determining if the target device supports the operands and the response command informs the controller if the target device supports the operands. The inquiry command is a control inquiry command, status inquiry command or a notify inquiry command. Preferably, the network substantially complies with a version of the IEEE 1394 standard.

According to yet another aspect of the present invention, a control device for communicating with a target device over a network, the control device comprises means for generating an inquiry command including an opcode and any number of operands and means for communicating coupled to the means for generating and configured for coupling to the network for sending the inquiry command over the network to the target device and receiving a response command from the target device, wherein the response command includes notification informing the control device if the target device supports the opcode and operands. The inquiry command is a control inquiry command, status inquiry command or a notify inquiry command. Preferably, the network substantially complies with a version of the IEEE 1394 standard.

According to still yet another aspect of the present invention, a control device configured to communicate with a target device over a network, the control device comprises a data packet generating circuit to generate an inquiry command including an opcode and any number of operands and an interface circuit coupled to the data packet generating circuit and configured to couple to the network to send the inquiry command over the network to the target device and receive a response command from the target device, wherein the response command includes notification informing the control device if the target device supports the opcode and operands. The inquiry command is a control inquiry command, status inquiry command or a notify inquiry command. Preferably, the network substantially complies with a version of the IEEE 1394 standard.

According to another aspect of the present invention, a control inquiry AV/C command data packet used to inquire about capabilities relative to a control command of a target device over a network comprises an opcode and one or more operands. Preferably, the network substantially complies with a version of the IEEE 1394 standard.

According to yet another aspect of the present invention, a status inquiry AV/C command data packet used to inquire about capabilities relative to a status command of a target device over a network, the status inquiry AV/C command data packet comprising an opcode. The status inquiry AV/C command data packet further comprises one or more operands. Preferably, the network substantially complies with a version of the IEEE 1394 standard.

According to still yet another aspect of the present invention, a notify inquiry AV/C command data packet used to inquire about capabilities relative to a notify command of a target device over a network, the notify inquiry AV/C command data packet comprising an opcode. The notify inquiry AV/C command data packet further comprises one or more operands. Preferably, the network substantially complies with a version of the IEEE 1394 standard.

According to another aspect of the present invention, a method of inquiring of capabilities of a target device from a control device over an IEEE 1394 serial bus comprises submitting an AV/C inquiry command data packet from a control device over the serial bus to a target device, wherein the inquiry command data packet includes an opcode and any number of operands, receiving the inquiry command data packet at the target device and generating a response data packet therefrom, wherein the response data packet specifies whether the target device supports the opcode and operands and transmitting the response data packet to the control device. The inquiry command is a control inquiry command, status inquiry command or a notify inquiry command.

According to yet another aspect of the present invention, a network of devices coupled together by a standard IEEE 1394 serial bus comprises a control device in communication with the standard IEEE 1394 serial bus and configured for sending an inquiry command including an opcode and any number of operands over the standard IEEE 1394 serial bus and a target device in communication with the standard IEEE 1394 serial bus and configured for receiving the inquiry command, determining if the target device supports the opcode and operands and sending a response command to the control device over the standard IEEE 1394 serial bus informing the control device if the target device supports the opcode and operands. The inquiry command is a control inquiry command, status inquiry command or a notify inquiry command.

DETAILED DESCRIPTION OF THE PREFERRED EMBODIMENT

Figure 1:
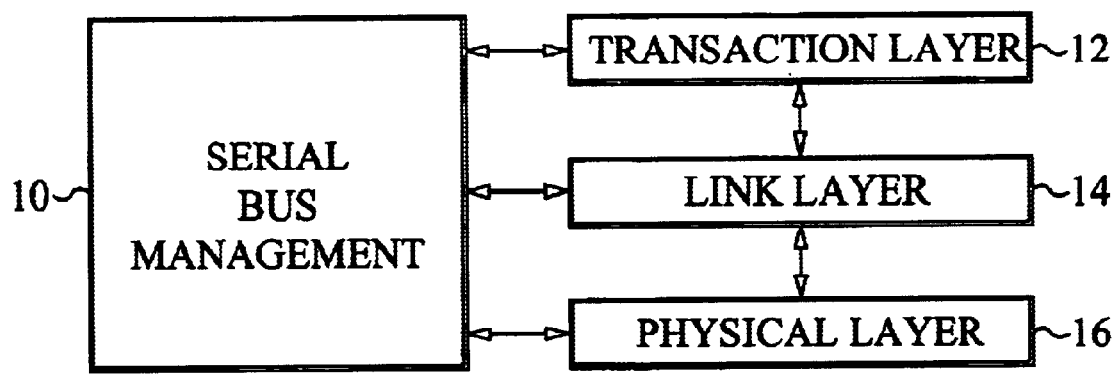
FIG. 1 illustrates a protocol of the IEEE 1394-2000 standard.
Figure 2:
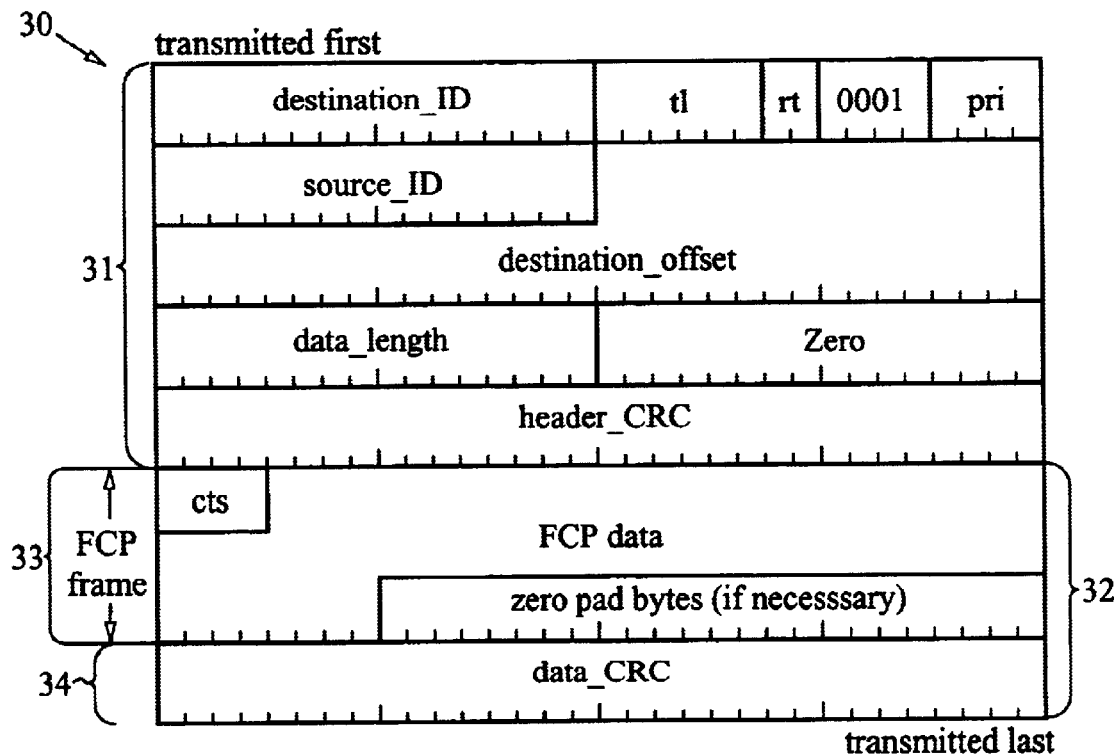
FIG. 2 illustrates a standard AV/C command and response data packet in accordance with the AV/C Digital Interface Command Set for asynchronous data packet transmission over an IEEE 1394-2000 serial bus network.
Figure 3A:
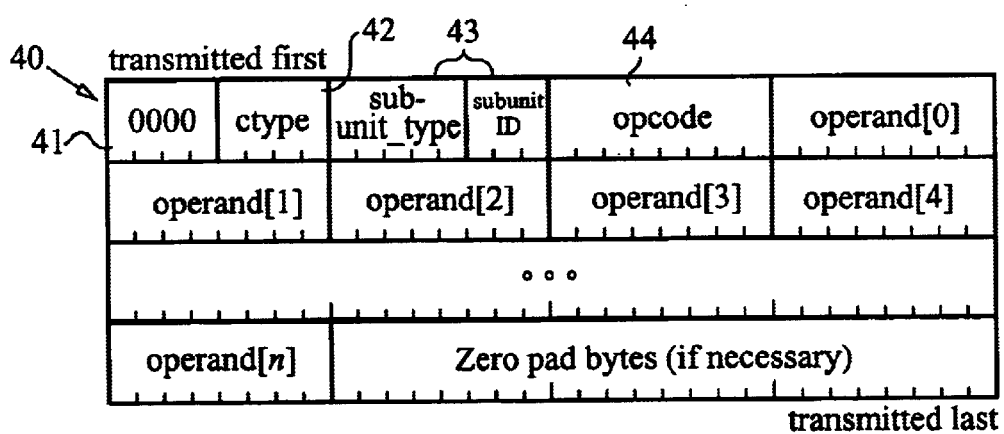
FIGS. 3A and 3B show command and response data frames, respectively, formatted according to the standard AV/C protocol.
Figure 3B:
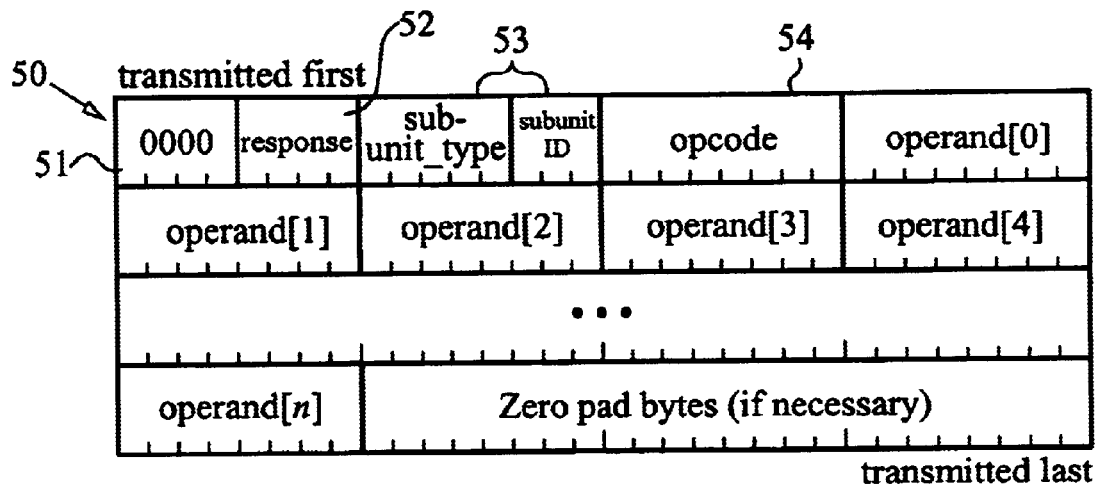
Figure 4:
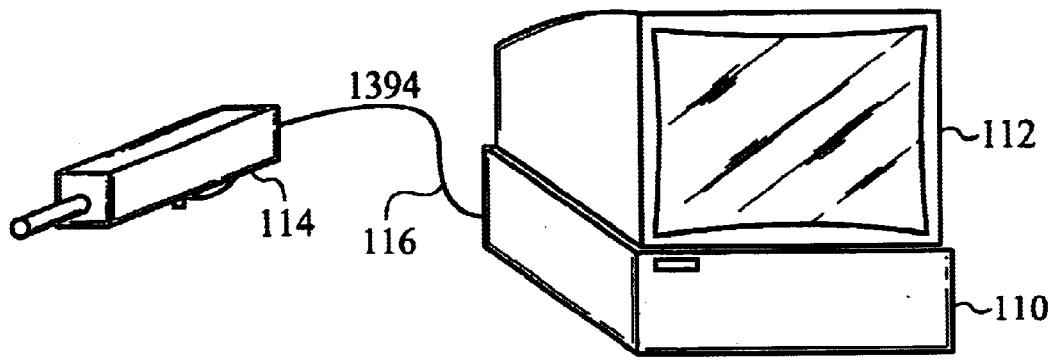
FIG. 4 illustrates an exemplary IEEE 1394-2000 serial bus network including a computer system and a video camera.

A block diagram of an exemplary IEEE 1394-2000 serial bus network including a computer system and a video camera is illustrated in FIG. 4. The computer system 110 includes an associated display 112 and is coupled to the video camera 114 by the IEEE 1394-2000 serial bus cable 116. Video data and associated data are sent between the video camera 114 and the computer 110 over the IEEE 1394-2000 serial bus cable 116.

Figure 5:
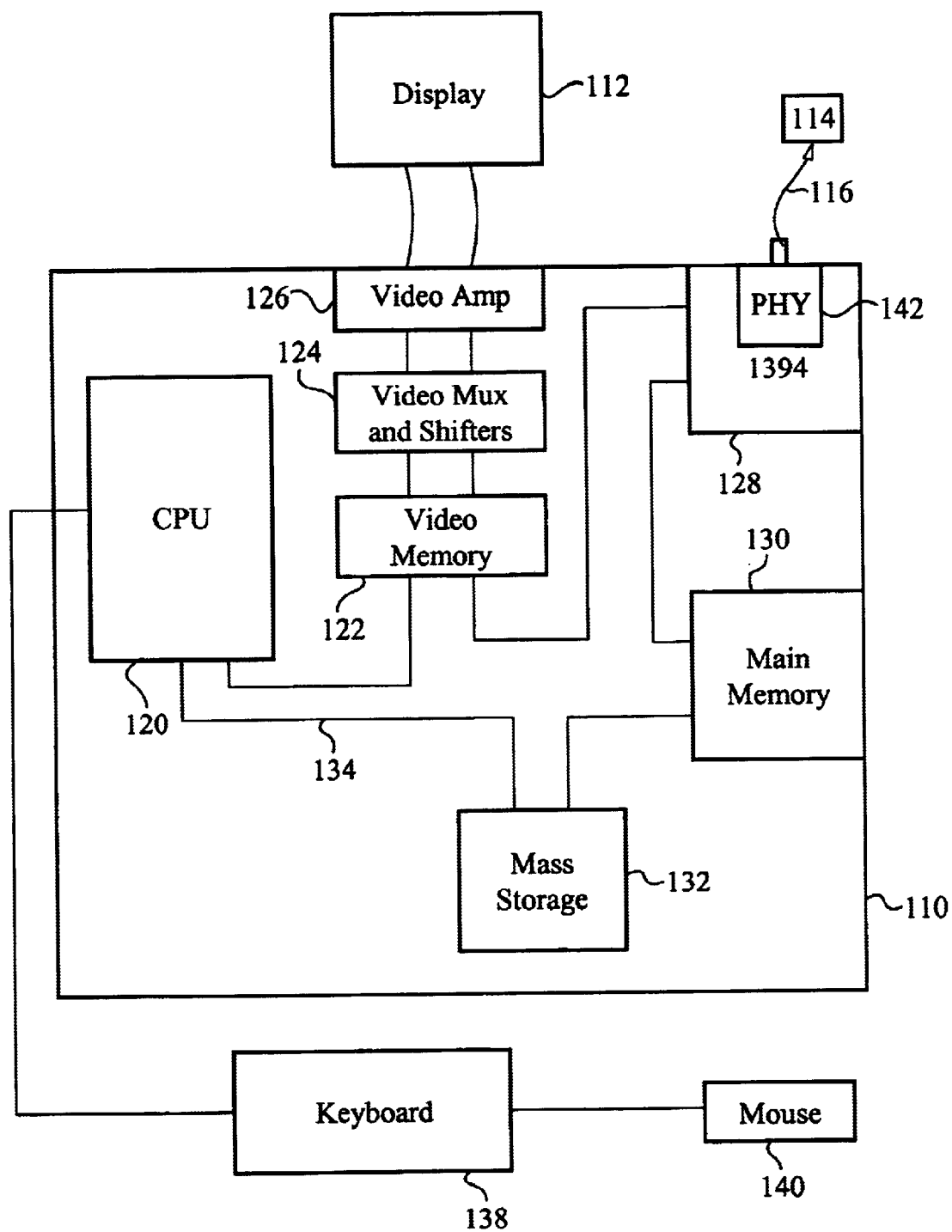
FIG. 5 illustrates a block diagram of the internal components of the computer system 110.

A block diagram of the internal components of the computer system 110 is illustrated in FIG. 5. The computer system 110 includes a central processor unit (CPU) 120, a main memory 130, a video memory 122, a mass storage device 132 and an IEEE 1394-2000 interface circuit 128, all coupled together by a conventional bidirectional system bus 134. The interface circuit 128 includes the physical interface circuit 142 for sending and receiving communications over the IEEE 1394-2000 serial bus. The physical interface circuit 142 is coupled to the camera 114 over the IEEE 1394-2000 serial bus cable 116. In the preferred embodiment of the present invention, the interface circuit 128 is implemented on an IEEE 1394-2000 interface card within the computer system 110. However, it should be apparent to those skilled in the art that the interface circuit 128 can be implemented within the computer system 110 in any other appropriate manner, including building the interface circuit onto the motherboard itself. The mass storage device 132 may include both fixed and removable media using any one or more of magnetic, optical or magneto-optical storage technology or any other available mass storage technology. The system bus 134 contains an address bus for addressing any portion of the memory 122 and 130. The system bus 134 also includes a data bus for transferring data between and among the CPU 120, the main memory 130, the video memory 122, the mass storage device 132 and the interface circuit 128.

The computer system 110 is also coupled to a number of peripheral input and output devices including the keyboard 138, the mouse 140 and the associated display 112. The keyboard 138 is coupled to the CPU 120 for allowing a user to input data and control commands into the computer system 110. A conventional mouse 140 is coupled to the keyboard 138 for manipulating graphic images on the display 112 as a cursor control device.

A port of the video memory 122 is coupled to a video multiplex and shifter circuit 124, which in turn is coupled to a video amplifier 126. The video amplifier 126 drives the display 112. The video multiplex and shifter circuitry 124 and the video amplifier 126 convert pixel data stored in the video memory 122 to raster signals suitable for use by the display 112.

Figure 6:
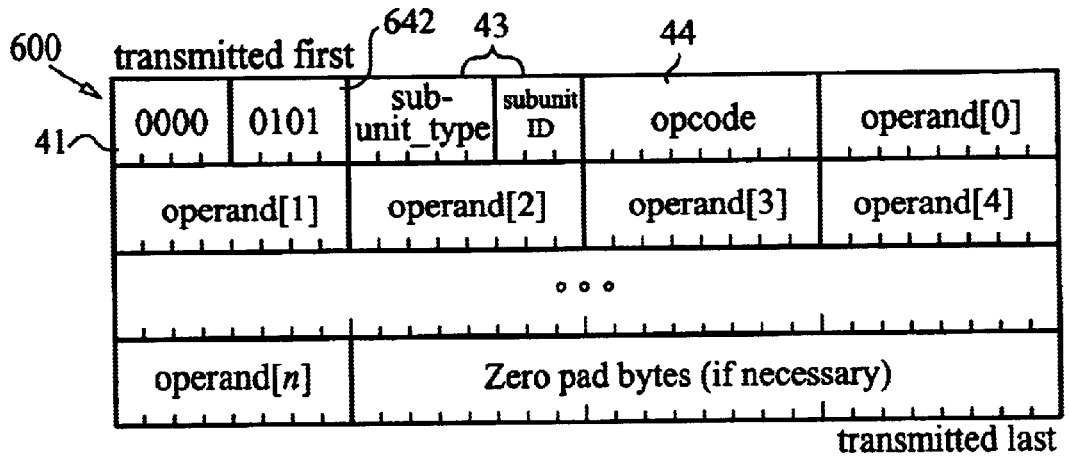
FIG. 6 illustrates a status inquiry command type FCP data frame, according to the preferred embodiment of the present invention.

As described above, the present invention adds a status inquiry command type, a notify inquiry command type and a control inquiry command type. The status inquiry command type is sent by a controller to a target device to determine whether or not the target device supports a status command. Preferably, the status inquiry command type of the present invention has a ctype data field value of 0101. A status inquiry command type FCP data frame, according to the preferred embodiment of the present invention, is illustrated in FIG. 6. The ctype data field 642 of the command FCP data frame 600 has a value of 0101 indicating that it is a status inquiry command type. Any number of operands may be included by the controller in this status inquiry command type data frame 600, including none. If no operands are included within the status inquiry command type data frame 600, then the target device issues a response notifying the controller whether or not the target device supports the status command specified by the opcode. If some number of operands are included within the status inquiry command type data frame 600, then the target device issues a response notifying the controller whether or not the target device supports the status commands specified by the opcode and all of the included operands.

Figure 7:
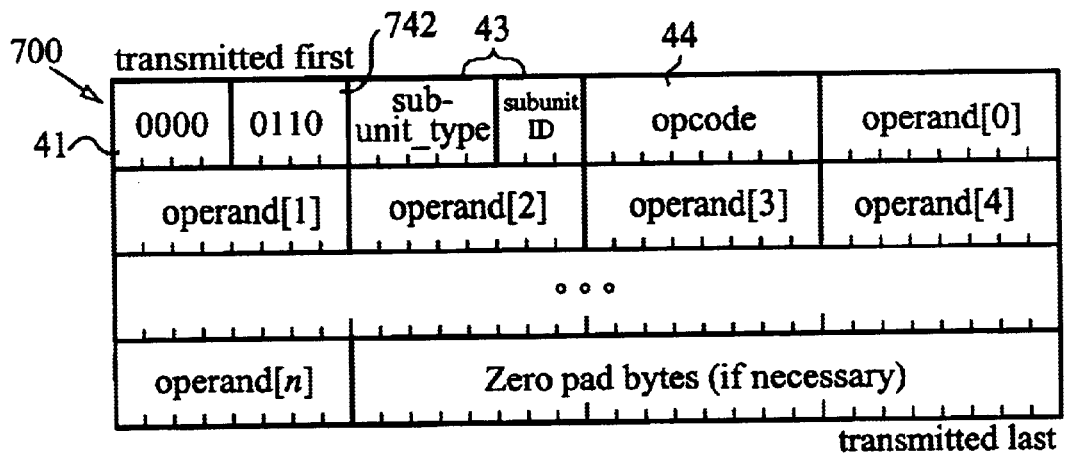
FIG. 7 illustrates a notify inquiry command type FCP data frame, according to the preferred embodiment of the present invention.

The notify inquiry command type is sent by a controller to a target device to determine whether or not the target device supports a notify command. Preferably, the notify inquiry command type of the present invention has a ctype data field value of 0110. A notify inquiry command type FCP data frame, according to the preferred embodiment of the present invention, is illustrated in FIG. 7. The ctype data field 742 of the command FCP data frame 700 has a value of 0110 indicating that it is a notify inquiry command type. Any number of operands may be included by the controller in this notify inquiry command type data frame 700, including none. If no operands are included within the notify inquiry command type data frame 700, then the target device issues a response notifying the controller whether or not the target device supports the notify command specified by the opcode. If some number of operands are included within the notify inquiry command type data frame 700, then the target device issues a response notifying the controller whether or not the target device supports the notify commands specified by the opcode and all of the included operands.

As described above, preferably the status inquiry and notify inquiry commands can include any number of operands. The target device will then determine if and how many operands are included within the status inquiry or notify inquiry command and respond accordingly, taking into account the opcode and the operands included within the status inquiry or notify inquiry command. In this same manner, the existing general inquiry and specific inquiry commands, which allow inquiries relating to control commands can be replaced by a single control inquiry command according to the preferred embodiment of the present invention. This control inquiry command preferably can include any number of operands, including none. If the control inquiry command includes operands, then the target device handles the control inquiry command as a specific inquiry and responds to the controlling device based on the opcode and the operands in the control inquiry command. If the control inquiry command includes only an opcode and no operands, then the target device handles the control inquiry command as a general inquiry and responds to the controlling device based on the opcode in the control inquiry command.

Figure 8:
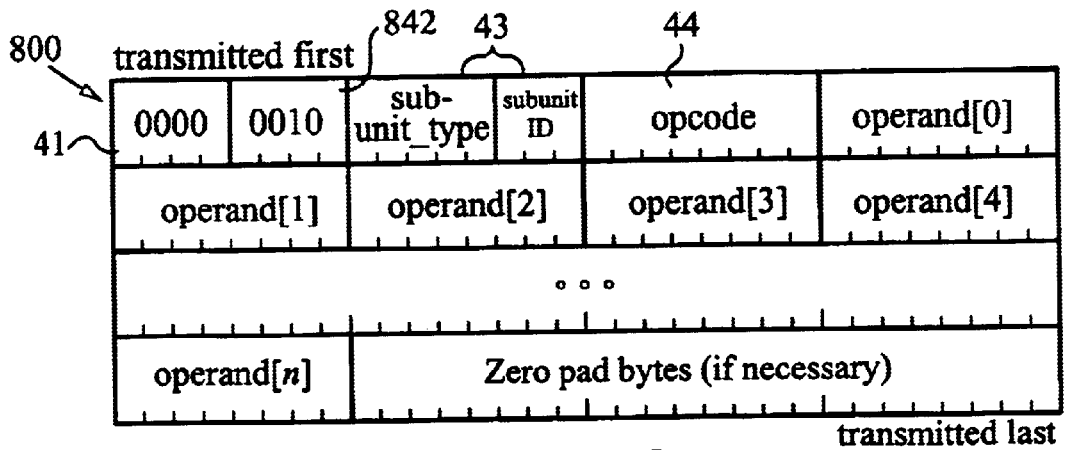
FIG. 8 illustrates a control inquiry command type FCP data frame, according to the preferred embodiment of the present invention.

A control inquiry command type FCP data frame, according to the preferred embodiment of the present invention is illustrated in FIG. 8. Preferably, the control inquiry command type of the present invention has a ctype data field value of 0010. The ctype data field 842 of the control inquiry command FCP data frame 800 has a value of 0010 indicating that it is a control inquiry command type. Any number of operands may be included by the controller in this control inquiry command type data frame 800, including none. If no operands are included within the control inquiry command type data frame 800, then the target device handles the control inquiry command as a general inquiry and responds to the controlling device notifying the controlling device whether or not the target device supports the control command specified by the opcode. If some number of operands are included within the control inquiry command type data frame 800, then the target device handles the control inquiry command as a specific inquiry and issues a response notifying the controlling device whether or not the target device supports the control commands specified by the opcode and all of the included operands.

Figure 9:
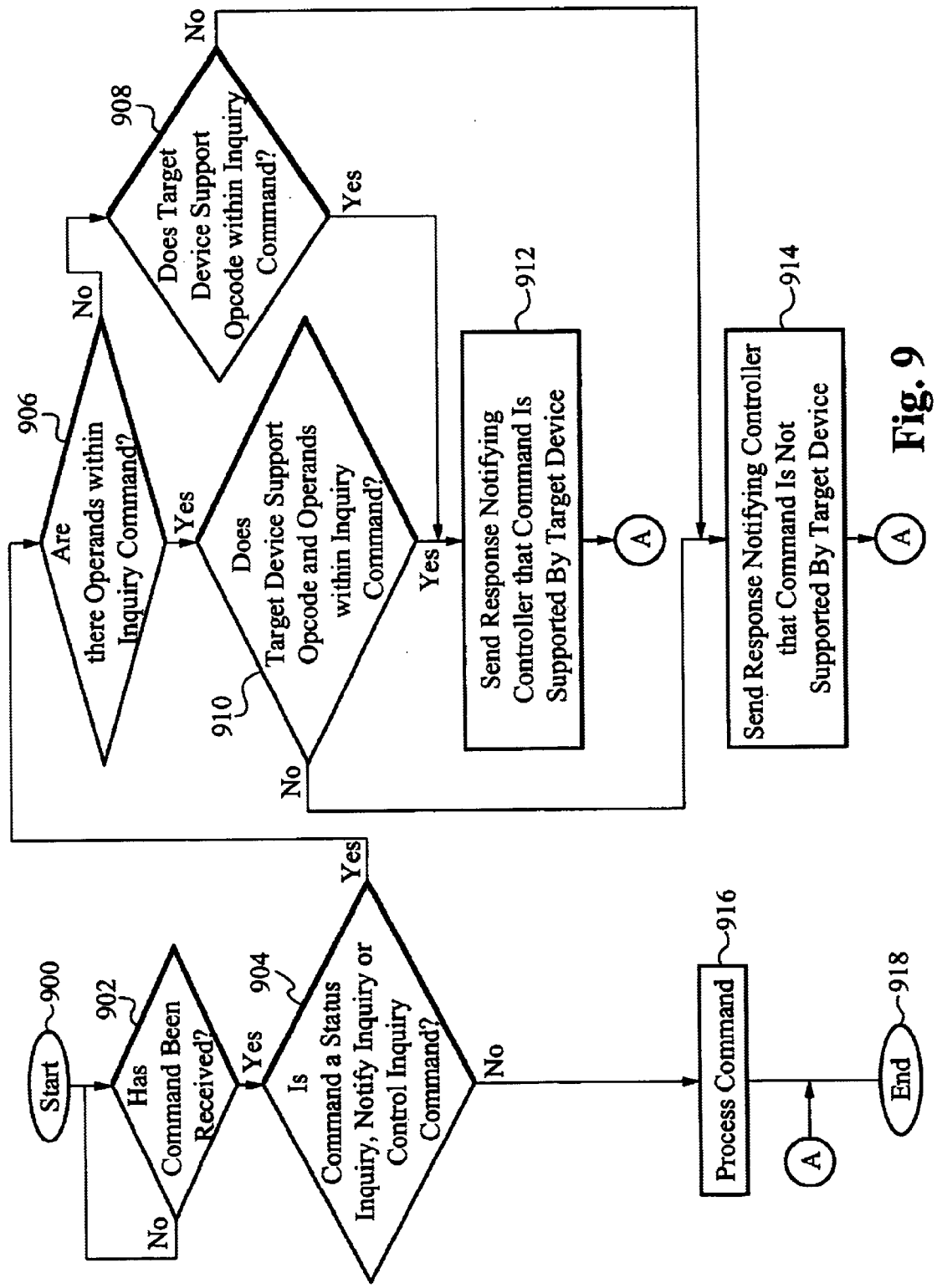
FIG. 9 illustrates a flowchart of the steps within the method of the preferred embodiment of the present invention.

A flowchart illustrating the steps within the method of the present invention is illustrated in FIG. 9. The method of the present invention begins at the step 900. At the step 902 it is determined whether or not the target device has received a command. Once it is determined that the target device has received a command, then it is determined at the step 904 if the command is a status inquiry command a notify inquiry command or a control inquiry command. If it is determined that the command is a status inquiry command, notify inquiry command or a control inquiry command then it is determined at the step 906 whether there are any operands within the inquiry command. If it is determined that there are operands within the inquiry command, then it is determined at the step 910 whether or not the target device supports the opcode and the operands within the inquiry command. If it is determined that the target device does support the opcode and the operands, then at the step 912 the target device sends a response notifying the controller that the command is supported by the target device. If it is determined at the step 910 that the target device does not support the opcode and the operands within the inquiry command, then at the step 914 the target device sends a response notifying the controller that the command is not supported by the target device.

If it is determined at the step 906 that there are no operands within the inquiry command, then it is determined at the step 908 whether or not the target device supports the opcode within the inquiry command. If it is determined that the target device does support the opcode, then at the step 912 the target device sends a response notifying the controller that the command is supported by the target device. If it is determined at the step 908 that the target device does not support the opcode within the inquiry command, then at the step 914 the target device sends a response notifying the controller that the command is not supported by the target device. After the response in either step 912 or step 914 is sent, then the method ends at the step 918.

If it is determined at the step 904, that the command is not a status inquiry command, a notify inquiry command or a control inquiry command then at the step 916 the command is processed in an appropriate manner by the target device. The method then ends at the step 918.

Table III below includes the different types of commands within the AV/C command set including the status inquiry, notify inquiry and control inquiry commands of the preferred embodiment of the present invention.

TABLE III

AV/C Command Types

| VALUE | COMMAND TYPE |
| --- | --- |
| 0 | CONTROL |
| 1 | STATUS |
| 2 | CONTROL INQUIRY |
| 3 | NOTIFY |
| 4 | Reserved for future specification |
| 5 | STATUS INQUIRY |
| 6 | NOTIFY INQUIRY |
| 7 | Reserved for future specification |
| $8-F_{16}$ | Reserved for response codes |

The control, status and notify command types are as described above in reference to Table I. Preferably, a value of 0010 within the ctype data field indicates a control inquiry command type. This control inquiry command type is sent by a controller to a target device to determine whether or not the target device supports a particular control command. Except for the value within the ctype data field, the AV/C command frame for the control inquiry command may be identical to the corresponding control command. As described above, the control inquiry command can include any number of operands, including none. A controller may reliably use a control inquiry command to probe the capabilities of a target device. A target device that receives a control inquiry command shall return an AV/C response frame notifying the controller whether or not the target device supports the control command.

Preferably, a value of 0101 within the ctype data field indicates a status inquiry command type. This status inquiry command type is sent by a controller to a target device to determine whether or not the target device supports a particular status command. Except for the value within the ctype data field, the AV/C command frame for the status inquiry command may be identical to the corresponding status command. As described above, the status inquiry command can include any number of operands, including none. A controller may reliably use a status inquiry command to probe the capabilities of the target device. A target device that receives a status inquiry command shall return an AV/C response frame notifying the controller whether or not the target device supports the status command.

Preferably, a value of 0110 within the ctype data field indicates a notify inquiry command type. This notify inquiry command type is sent by a controller to a target device to determine whether or not the target device supports a particular notify command. Except for the value within the ctype data field, the AV/C command frame for the notify inquiry command may be identical to the corresponding notify command. As described above, the notify inquiry command can include any number of operands, including none. A controller may reliably use a notify inquiry command to probe the capabilities of a target device. A target device that receives a notify inquiry command shall return an AV/C response frame notifying the controller whether or not the target device supports the notify command.

The control inquiry command is used to determine the support by a target device for a control command including any number of operands. Because of this, the general inquiry command is not necessary and is preferably eliminated. Accordingly, the value of 0100 within the ctype data field is preferably reserved for future specification.

In operation, a controller, such as the computer system 110, sends a control inquiry, status inquiry or a notify inquiry command to a target device, such as the video camera 114, to determine whether or not the target device supports a particular control, status or notify command, respectively. When a target device receives a control inquiry, status inquiry or notify inquiry command, the target device first determines if the target device supports the opcode and any operands included in the inquiry command. The target device then sends a response to the controller informing the controller whether or not the target device supports the command.

The present invention modifies the AV/C command set to include status inquiry, notify inquiry and control inquiry commands. The status inquiry, notify inquiry and control inquiry commands include an opcode and any number of operands, including none. The status inquiry, notify inquiry and control inquiry commands are sent from a controller to a target device to determine if the target device supports a particular status, notify or control command, respectively. In response to a status inquiry, notify inquiry or control inquiry, a target device sends a response to the controller notifying the controller as to whether or not the target device supports the particular command. The status inquiry, notify inquiry and control inquiry commands allow a controller to determine the capabilities of a target device as to status, notify and control commands.

The present invention has been described in terms of specific embodiments incorporating details to facilitate the understanding of the principles of construction and operation of the invention. Such references, herein, to specific embodiments and details thereof are not intended to limit the scope of the claims appended hereto. It will be apparent to those skilled in the art that modifications can be made in the embodiment chosen for illustration without departing from the spirit and scope of the invention. Specifically, it will be apparent to one of ordinary skill that while the preferred embodiment of the present invention is used with an IEEE 1394-2000 serial bus structure, the present invention could also be implemented on any other appropriate digital interfaces or bus structures, including other or later versions of the IEEE 1394 serial bus.

I claim:

1. A method of inquiring of capabilities of a target device comprising:
   a. sending an inquiry command including an opcode and any number of operands over a network from a controller to a target device;
   b. determining at the target device if the target device supports the opcode and operands; and
   c. sending a response command from the target device to the controller over the network informing the controller if the target device supports the opcode and operands.

2. The method as claimed in claim 1 wherein the inquiry command is a control inquiry command.

3. The method as claimed in claim 1 wherein the inquiry command is a status inquiry command.

4. The method as claimed in claim 1 wherein the inquiry command is a notify inquiry command.

5. The method as claimed in claim 1 wherein the network substantially complies with a version of the IEEE 1394 standard.

6. A method of inquiring of capabilities of a target device comprising:
   a. sending an inquiry command, selected from a group of a status inquiry command and a notify inquiry command, including an opcode, over a network from a controller to a target device;
   b. determining at the target device if the target device supports the opcode; and
   c. sending a response command from the target device to the controller over the network informing the controller if the target device supports the opcode.

7. The method as claimed in claim 6 wherein the inquiry command further comprises one or more operands and further wherein determining also includes determining if the target device supports the operands and the response command informs the controller if the target device supports the operands.

8. The method as claimed in claim 6 wherein the inquiry command is a control inquiry command.

9. The method as claimed in claim 6 wherein the inquiry command is a status inquiry command.

10. The method as claimed in claim 6 wherein the inquiry command is a notify inquiry command.

11. The method as claimed in claim 6 wherein the network substantially complies with a version of the IEEE 1394 standard.

12. A method of inquiring of capabilities of a target device from a control device over an IEEE 1394 serial bus comprising:

a. submitting an AV/C inquiry command data packet from a control device over the serial bus to a target device, wherein the inquiry command data packet includes an opcode and any number of operands;

b. receiving the inquiry command data packet at the target device and generating a response data packet therefrom, wherein the response data packet specifies whether the target device supports the opcode and operands; and c. transmitting the response data packet to the control device.

13. The method as claimed in claim 12 wherein the inquiry command data packet is a control inquiry command.

14. The method as claimed in claim 12 wherein the inquiry command data packet is a status inquiry command.

15. The method as claimed in claim 12 wherein the inquiry command data packet is a notify inquiry command.

* * * * *